UNITED STATES PATENT OFFICE.

OMAR T. JOSLIN, OF CINCINNATI, OHIO.

PROCESS OF PRODUCING FAT OR OIL SUBSTANCES.

1,152,023.  Specification of Letters Patent.  Patented Aug. 31, 1915.

No Drawing.   Application filed May 10, 1913.   Serial No. 766,865.

*To all whom it may concern:*

Be it known that I, OMAR T. JOSLIN, a citizen of the United States, residing at Cincinnati, in the county of Hamilton and State of Ohio, have invented certain new and useful Improvements in Processes of Producing Fat or Oil Substances, of which the following is a specification.

My invention relates to a process of purifying hardened or hydrogenized fats or oils.

The object is to produce a mixture of glycerids, free from uncombined fatty acids, soaps, unsaponifiable bodies, and the by-products of catalytic reaction; also free from objectionable taste, odor, flavor and readily oxidizable components, this product being further characterized by rancidity resisting properties, rendering it suitable for food or cooking purposes.

The resultant of the hydrogenizing treatment comprises a mixture of free, and combined fatty acids, containing the impurities of the original oil, together with additional objectionable substances resultant from the hydrogenizing and catalytic reactions and unsaponifiable bodies which cannot be satisfactorily removed by ordinary methods of filtration or separation. I have discovered that these impurities, free fatty acids and generated objectionable substances, carry undesirable tastes, flavors, odors and other properties.

It is therefore an essential object of my invention to so refine the initial products as to remove therefrom all objectionable matter and thereby convert the original products into new and superior substances, the ultimate resultant containing relatively greater proportions of combined fatty acids, rendered free of uncombined fatty acids, the original impurities, unsaponifiable or objectionable generated substances.

The ultimate purpose of the invention is to produce commercial substances in the nature of mixtures of combined fatty acids, of stable and dependable composition and character, having rancidity-resisting property, and characterized by the absence of objectionable tastes, flavors, odors, property, constituents, or deleterious impurities of original condition or subsequent reaction.

The hydrogenizing treatment is not a part of my invention, but I will briefly describe it in order that the resultant conditions may be understood, as my process depends upon this original condition. This treatment is effected by placing the original fat or oil in a suitable vessel and hydrogenizing the charge in the presence of a catalytic body such as nickel, maintaining the charge above the melting point of the stearin component. This treatment will suitably saturate a desired proportion of the glycerids, and at the same time will partially deoxidize the preëxisting components having ready rancidity-producing proclivities. The period of this treatment is determined by the desired consistency of the ultimate substance.

My process comprises a treatment of the resultant substance of the hydrogenizing reaction to free the same from uncombined fatty acids, impurities, (original or generated by the initial reactions) unsaponifiable bodies, or rancidity-tending-oxidation components, constituting objectionable ingredients of the mixed, combined fats or oils. Preferably I employ for this purpose, a member of the alcohol series, having highly selective solvent characteristics, that is, a reagent in which the fats or oils are but slightly soluble, and the impurities and objectionable substances are readily soluble. Denatured alcohol, wood spirits, or different species of the alcohol series, of varying grades, are available for this purpose. In carrying out this step, I add to the charge of initially treated oil, of whatever predetermined consistency, an approximately equal volume of an alcohol, maintaining the hydrogenized oil in fluid condition and agitate the mixture to thoroughly commingle the oil and alcohol. During this intermixing period, I maintain relatively low temperatures, just sufficient to maintain the proper fluidity of the fats or oils.

A small per cent. of the alcohol, say from three to five per cent., will dissolve into the oil, while the impurities and objectionable substances will readily dissolve into the alcohol.

The free or uncombined fatty acids being readily soluble in alcohol, and existing in relatively slight proportions after the hydrogenizing step, will dissolve entirely into the alcohol, whereas the more or less saturated fatty acids and other glycerids, are relatively insoluble therein. The alcohol treatment also removes the rancidity producing oxidation products not sufficiently deoxidized by the hydrogenizing treatment.

One or several washing treatments may be administered, depending upon the amount of impurities contained in the original oil, the consistency of the same, and the quantity of by-products resultant from the hydrogenizing step.

My next step is to make a gravimetric separation of the alcohol containing the objectionable matter in solution, from the oil containing a small proportion of the alcohol in solution. This step may be by way of decanting, siphoning, or centrifugal separation, but it is desirable to effect the separation while the oil is fluid as otherwise the undesirable bodies would tend to crystallize out of the solution and become reincorporated into the condensing oil. Of course, upon the suspension of the agitation, the oil, of greater specific gravity, will sink, and the superposed alcohol solution of readily soluble matter can readily be removed.

My next step is to distil, or otherwise volatilize from the separated oil, the slight residual alcohol in solution therewith. Preferably, I follow this step with a super-refining treatment which consists in passing a current of inert gas, such as steam, through the fluid oil, thus eliminating the final traces of impurities amenable to such action. The refined substance is then allowed to cool preferably in an atmosphere of inert gas.

It is obvious that while the fullest embodiment of my invention involves the initial hydrogenizing step, that the essential principle of the invention comprises an application of the process to a suitable hydrogenized oil.

Auxiliary refinements of filtering or bleaching may be employed if desired, either previous to or subsequent to the alcohol treatment.

The resultant is a suitably hydrogenized fat or oil, characterized by an absence of deleterious or disagreeable substances, tastes, flavors, odors, etc., rendering a stable, rancidity-resisting fat or oil substance, of superior character and composition.

My new substance, whether a liquid, or solid body of varying but predetermined consistency, is characterized by containing a relatively inappreciable proportion of free fatty acids, and a relatively large proportion of combined fatty acids, free from impurities, unsaponifiable bodies, rancidity-tending oxids, bodies and by-product substances of objectionable or unstable character and composition, comprising a substantially homogeneous mixture of relatively chemically pure glycerids.

Having described my invention, I claim:—

The herein described process of treating hardened fats or oils which have been hydrogenized in the presence of a metallic catalytic, which consists, first, in treating a given charge at least with an approximately equal volume of a solvent having the property of being slightly soluble in the treated substance, and in which the impurities are readily soluble, intermixing the same thoroughly at relatively low temperatures, second, in gravimetrically separating the solvent containing the impurities, and third, in volatilizing from the treated charge the slight amount of the solvent which is held in solution.

In testimony whereof, I have hereunto set my hand.

OMAR T. JOSLIN.

Witnesses:
 OLIVER B. KAISER,
 CLARENCE B. FOSTER.